Figure 1:
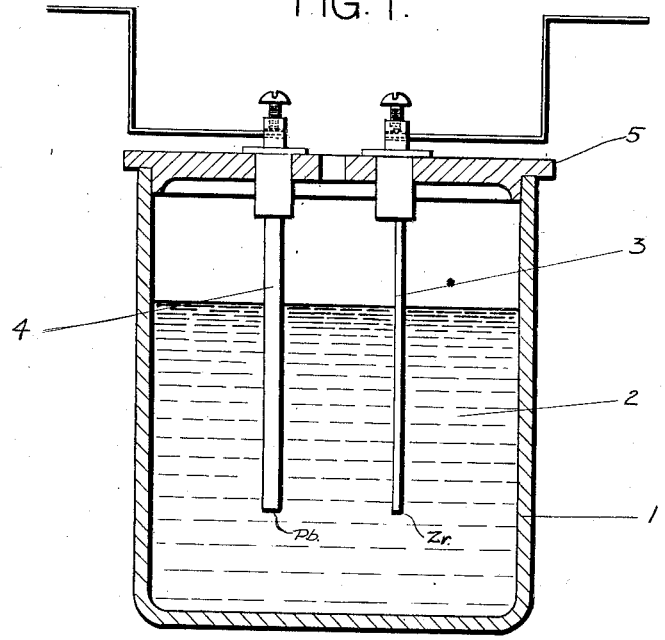

Nov. 15, 1927.

E. ROMANELLI 1,648,963

ELECTROLYTIC CELL

Filed July 30, 1926

INVENTOR
Emilio Romanelli
BY
ATTORNEY

Patented Nov. 15, 1927.

1,648,963

UNITED STATES PATENT OFFICE.

EMILIO ROMANELLI, OF BLOOMFIELD, NEW JERSEY, ASSIGNOR TO WESTINGHOUSE LAMP COMPANY, A CORPORATION OF PENNSYLVANIA.

ELECTROLYTIC CELL.

Application filed July 30, 1926. Serial No. 125,838.

This invention relates to electrolytic cells, such as condensers, lightning arresters, rectifiers and the like, and more particularly to electrolytic cells having an electrode or electrodes composed of an improved film-forming metal adapted for operation in a suitable film-forming electrolyte.

A number of metals have been proposed heretofore for use as electrodes in suitable electrolytes and which possess to some extent, the property of offering a high resistance to the flow of current from the electrode to the electrolyte, but very little resistance to the current flow in the opposite direction. Such metals are aluminum, tungsten, tantalum, bismuth and magnesium, but of these, only aluminum and tantalum have been successfully used in practice as electrolyte rectifiers. The aluminum rectifier, moreover, has been of little use due to its low efficiency and the careful attention required for its successful operation. Due to the rapid deterioration of the aluminum by the acid electrolytes it is necessary to employ neutral salts which have a high resistance, and limit the output current to a few tenths of an ampere. Other serious disadvantages render the aluminum rectifier unsatisfactory. The tantalum rectifier is much better in its operating characteristics but the tantalum metal is much more expensive and the break-down is relatively low.

One of the objects of the present invention is to provide an improved valve metal which has a high film-forming propensity and which is economical to produce.

Another object is to provide a film-forming conductor for use in suitable electrolytes, which will not be deteriorated by the electrolyte.

Another object is to provide a film-forming metal for electrolytic cells, which does not require a high current density to maintain the active film thereon and which film resists relatively high voltages.

A further object is to provide an electrolytic rectifier having a high efficiency which may be operated at relatively high amperage without over-heating.

Other objects and advantages will hereinafter appear.

I have discovered that zirconium, in substantially pure form, has exceptional properties as a valve metal, the oxide film rapidly forming thereon and being highly resistant to impressed voltages of considerable magnitude. When employed as electrodes in electrolytic rectifiers, the zirconium produces a high percentage rectification and it may be employed without deterioration in acid electrolytes, such as sulphuric acid which have a high electrical conductivity. Zirconium is also admirably suited for other forms of electrolytic cells, such as lightning arresters, due to its high break-down potential.

Figure 2:
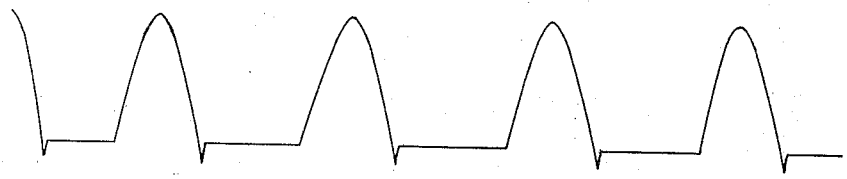

In order that the invention may be more fully understood reference may be had to the accompanying drawing in which:

Fig. 1 illustrates a conventional form of electrolytic cell suitable for use as a rectifier; and, Fig. 2 is a reproduction of an oscillogram obtained from the rectifier shown in Fig. 1.

The electrolytic cell comprises a suitable container 1 having a film forming electrolyte 2 therein, such as sulphuric acid, and cathode 3 composed of zirconium, and an anode 4, preferably consisting of lead, although other suitable metals or carbon may be employed. The anode 4 should have a considerably larger surface area than the zirconium electrode.

The size of the zirconium electrode is not critical and good results have been obtained with sizes varying from 60 mil wire to 200 mil rod. However, I prefer to employ a wire of about 75 mil size. The zirconium wire may be immersed in the electrolyte about 1½ inches. Further immersion does not appear to appreciably affect the operation of the device and is unnecessary. The spacing of the electrodes also does not appear to be critical since equally good rectification is obtained with a spacing of from ¼ inch to 1 inch. Wider spacing has not been tried. For convenience in manufacture I prefer to space the electrodes from ½ to ¾ inches apart.

With a current consumption up to 1 ampere such as might be used for trickle charging or for supplying the plate current for radio receiving apparatus I have found that a jar having a capacity of about 200 cc. of the electrolyte is ample since at this discharge rate the heating effect is negligible. When operating the rectifier at higher discharge rates it may be necessary to employ a larger quantity of electrolytes to prevent over-heating of the rectifier. With a discharge rate of from 2½ to 3 amperes a quart jar has been found to be entirely satisfactory.

The specific gravity of the sulphuric acid electrolyte may be about 1.250. In order to maintain the charging rate more uniform and prevent fluctuation therein, a metallic ingredient may be added to the electrolyte. For this purpose I prefer to employ about 1 gram of ferrous sulphate per 100 cc. of electrolyte.

A film of oil may be provided over the surface of the electrolyte to prevent sparking at the surface and consequent pitting if desired, although I have found it unnecessary; glass tubes or other suitable insulation may be disposed about the zirconium electrode extending a slight distance above and below the surface of the electrolyte.

In order that the oxide film produced on the zirconium shall be of uniformly high quality it is desirable to thoroughly clean the surface of the electrode prior to the formation of the film. This may be done mechanically, as by grinding on an emery wheel, chemically, as by corrosive solutions or electro-chemically, as by making the zirconium the anode of an electrolytic bath in which the zirconium goes into solution.

After the zirconium has been cleaned it is mounted in the cap 5 of the cell together with the lead electrode and immersed in the electrolyte. The electrodes are then connected either to an alternating or direct current source of electricity to form the oxide film thereon. When employing direct current, the zirconium electrode should be made the anode. The film forms in from one to five seconds depending on the conditions. It is not necessary to apply over-voltage to effect the formation of the film since it will form at the normally applied voltages although higher voltages may be used with the formation of what is probably a heavier and more resistant film.

With a rectifier constructed in accordance the above description connected to a 6 volt storage battery a charging rate of 1.0 ampere and .55 amperes was obtained with an impressed potential of 13½ volts and 11½ volts, respectively.

The degree of rectification of the rectifier may be expressed by the ratio:

$$\frac{DC}{AC} = \frac{\text{average value of current}}{\text{root means square value of current}}$$

In the simplest case of half wave rectification the theoretical maximum degree of rectification obtainable when the circuit is free from inductance and capacity would be expressed as follows:

$$\frac{DC}{AC} = \frac{\int_0^\pi \frac{I \max \sin \theta \cdot d\theta}{2\pi}}{\int_0^\pi \frac{I^2 \max \sin^2 \theta \cdot d\theta}{2\pi}}$$

This theoretical maximum is very closely approached with the rectifier of the present invention as indicated by the readings and calculations given below and obtained with a number of rectifiers operating under different conditions.

| Impressed volts | Amps. A. C. | Amps. D. C. | $\frac{DC}{AC}$ |
|---|---|---|---|
| 16½ | 2.5 | 1.35 | .540 |
| 18½ | 2.5 | 1.4 | .560 |
| 20½ | 2.9 | 1.65 | .569 |
| 22½ | 2.7 | 1.61 | .555 |

In Fig. 2 is shown a reproduction of an oscillogram obtained with the rectifier with a potential of 12 volts and a rectified current of 0.9 amperes. This oscillogram is representative of the degree of rectification obtained at other current values, such as .25, .50 and 1.0 amperes. It will be noted that the inverse current in the oscillogram is extremely small and that substantially complete half wave rectification is obtained.

In the field of electrolytic lightning arresters, zirconium is particularly efficacious since it has a high break-down voltage, above 110 volts, and low leakage losses. For such use, of course, both electrodes are composed of zirconium. Ortho-phosphoric acid gave better results in lightning arresters than sulphuric acid.

When employed as a rectifier the breakdown potential of the zirconium electrode is in excess of 60 volts thus rendering the rectifier particularly suitable for use in supplying rectifier current for B-battery eliminators for radio receiving apparatus. Tantalum which approaches the other advantageous characteristic of zirconium more closely than any of the other valve metals, has a breakdown voltage of only about 30 volts under similar conditions of operation.

An important characteristic of the film formed on the zirconium electrode in an acid electrolyte is the permanency of the film. The film persists throughout long periods of disuse of the rectifier and does not have to be formed anew each time the rectifier is put into operation, as is the case with certain of the other valve metals, such as aluminum.

The zirconium employed as a valve metal should be as pure as possible and may be prepared in accordance with the process set forth in application Serial No. 106,584, Marden et al, filed May 3, 1926, entitled Sintering and fusing of zirconium powder into coherent zirconium and assigned to the Westinghouse Lamp Company.

While the invention has been described particularly with reference to a rectifier it is to be understood that it is not so limited but contemplates the use of zirconium in electrolytic cells of whatever nature where a valve action is desired or in which a film-forming metal is of advantage.

What is claimed is:

1. A film-forming conductor for electrolytic cells comprising zirconium.

2. A film-forming conductor for electrolytic cells adapted to be immersed in a film-forming electrolyte and having a surface exposed to the electrolyte that is composed of zirconium.

3. An electrode for an electrolytic cell composed of zirconium provided with an asymmetric film.

4. A film-forming electrode for an electrolytic cell embodying zirconium metal.

5. An electrolytic cell including an electrode composed of metallic zirconium and a film-forming electrolyte.

6. An electrolytic cell including an electrode composed of metallic zirconium and an electrolyte of sulphuric acid.

7. An electrolytic rectifier having a cathode consisting of metallic zirconium, an anode of lead and an electrolyte of sulphuric acid.

8. An electrolytic rectifier comprising an electrolyte and a plurality of electrodes, at least one of which has a surface exposed to the electrolyte that is covered with an asymmetrical film of a zirconium compound.

In testimony whereof, I have hereunto subscribed my name this 29th day of July 1926.

EMILIO ROMANELLI.